UNITED STATES PATENT OFFICE.

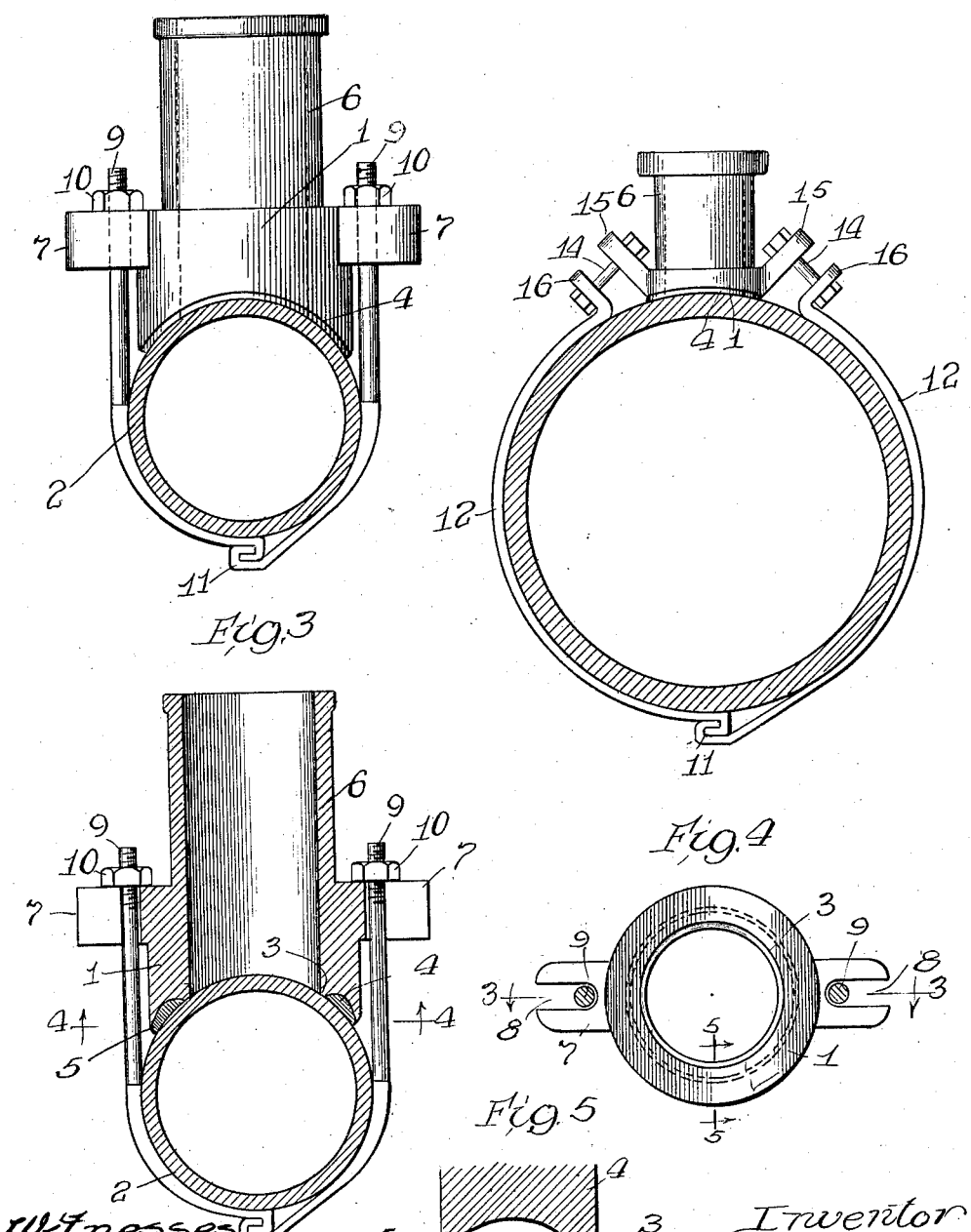

GEORGE R. BARD, OF CHICAGO, ILLINOIS, ASSIGNOR, BY MESNE ASSIGNMENTS, TO THE WATERWORKS SPECIALTY COMPANY, OF CHICAGO, ILLINOIS, A CORPORATION OF SOUTH DAKOTA.

PIPE CONNECTION.

963,498.      Specification of Letters Patent.      Patented July 5, 1910.

Application filed January 22, 1909. Serial No. 473,677.

*To all whom it may concern:*

Be it known that I, GEORGE R. BARD, a citizen of the United States, residing at Chicago, county of Cook, and State of Illinois, have invented certain new and useful Improvements in Pipe Connections, of which the following is a description.

My invention relates to means for connecting branch pipes or the like, to water, oil, gas or similar mains or containers.

The object of my invention is to provide a simple, reliable, and convenient device of the kind described adapted for making a connection to a container when the same is under pressure, and wherein the connection is secured to the container, and the joint between them is made thoroughly fluid tight before any opening is made in the container walls.

To this end my invention consists in the novel construction, arrangement, and combination of parts herein shown and described, and more particularly pointed out in the claims.

In the accompanying drawings, wherein like or similar reference characters indicate like or corresponding parts; Figure 1 is a side elevation of my connection shown in operative position upon a main. Fig. 2 is a similar view showing a slightly modified form of my device. Fig. 3 is a view similar to Fig. 1 showing a longitudinal section of the connection taken substantially on line 3—3 of Fig. 4. Fig. 4 is a section taken substantially on line 4—4 of Fig. 3. Fig. 5 is a partial section taken substantially on line 5—5 of Fig. 4, showing the preferred form of face adapted to coöperate with the container wall to hold the packing material in position.

In the form shown in the drawings, my connection consists of the tubular connection 1, having a face formed at one end adapted to coöperate with the surface of a steam, gas, water or other main or container 2, and with means at its opposite ends for conveniently attaching a valve, pipe, or the like to the connection and with means for rigidly holding my connection in position upon the main or container.

In the form shown, a part 3 at the inner edge of the face of my connection is formed to substantially fit the surface of the container with which it is to coöperate. The remainder of the face is suitably spaced from the surface of the retainer to receive a ring 4 of plastic, malleable or other suitable packing to form a perfectly tight joint between the connection and container.

The part 3 is provided to accurately control the position of the packing and prevent the probability of any portion of the packing extending into the interior of the connection. This part also operates as a wall so that the packing may be calked or forced inward against its outer surface to compress the packing and force the same into any depressions or crevices to form a satisfactory joint. In the form shown also a portion 5 at the outer margin of the face of my connection is spaced from the surface of the container slightly less than the desired thickness of the packing and the part of the face between the parts 3 and 5 is concaved or curved inward thus forming an annular chamber adapted to securely hold the packing in position and preventing the escape of the packing either inward or outward when it is in position. The chamber thus formed is of an extremely desirable shape to receive the packing into which it may be forced to form the most satisfactory and secure joint.

Any suitable means may be provided for attaching a valve, pipe, or the like to the opposite side or end of my connection. In the form shown a nipple or neck 6 or the usual or any preferred form is provided upon my device to which a valve or pipe may be attached by means of suitable packing in the usual or any desired manner. Any suitable means may be provided for attaching my connection to the main. As shown, a pair of lugs or ears 7—7 are provided upon opposite sides the member 1 each of which is provided with a slot 8 adapted to receive a bolt 9 or equivalent means for securing the connection in position.

In the form shown in Figs. 1 and 3, the bolt 9 is threaded at one end and its opposite end is flat and provided with a hook 11 or other suitable means adapted to interlock with a corresponding part upon the bolt 9 at the opposite side of the main to operate as a strap to rigidly bind my connection in position upon the main.

The form shown in Fig. 2, is particularly adapted where my connection is to be applied to a comparatively large main where it is impracticable to extend the ears 7—7 sufficiently to employ the form of clamp shown in Figs. 1 and 3. In this form the bands 12—12 are bent outward at their ends 16 adjacent the connection and are each provided with a suitable opening to receive a bolt 14 to attach the bands to the connection. In this case the ears 15—15 are formed at an angle corresponding with the angle of the extremities of the band 12.

In operation my connection is placed in the desired position upon the main, the bands 9 or 12 are passed around the container and connected after which the bolts are tightened to clamp the connection securely in place. When this is accomplished melted lead or other suitable material is introduced in the usual or any desired manner into the space between the connection and the surface of the container. The packing may now be calked or forced inward at the periphery of the ring of packing to expand the same against the face of the connection and the surface of the main to receive a thoroughly fluid tight joint. When thus arranged a suitable valve (not shown) may be attached to my connection and an opening formed in the wall of the main corresponding to the opening through the connection.

Having thus described my improvement, it is obvious that various immaterial modifications may be made in my device without departing from the spirit of my invention, hence I do not wish to be understood as limiting myself to the exact form and construction shown.

What I claim as new, and desire to secure by Letters Patent is:—

1. In a structure of the character described, the combination with a main conduit, of a branch conduit comprising a tubular head and a conducting pipe leading therefrom, the lower face of said head being transversely recessed upon the arc of a circle to cause the lower end of said head to fit snugly upon the periphery of the main conduit and the lower edge of said branch conduit being circumferentially recessed in such manner that the outer wall of said recess extends downwardly considerably farther than the inner wall thereof, the inner wall of said recess contacting with the main conduit and the lower edge of the outer wall of said recess being slightly spaced from said main conduit whereby packing may be forced into said recess after the branch conduit is in position with relation to the main conduit, and means for forcing said branch conduit tightly into contact with the main conduit.

2. In a structure of the character described, the combination with a main conduit, of a branch conduit comprising a tubular head and a conducting pipe leading therefrom, the lower face of said head being transversely recessed upon the arc of a circle to cause the lower end of said head to fit snugly upon the periphery of the main conduit and the lower edge of said branch conduit being circumferentially recessed in such manner that the outer wall of said recess extends downwardly considerably farther than the inner wall thereof, the inner wall of said recess contacting with the main conduit and the lower edge of the outer wall of said recess being slightly spaced from said main conduit whereby packing may be forced into said recess after the branch conduit is in position with relation to the main conduit, means for forcing said branch conduit tightly into contact with the main conduit, said means comprising a two part strap having interengaging ends at their lower portions and out-turned ears at the upper portions, and fastening devices which pass through said out-turned ears and through extensions of said head.

In testimony whereof, I have hereunto signed my name in the presence of two subscribing witnesses.

GEORGE R. BARD.

Witnesses:
BURTON U. HELLS,
CHARLES I. COBB.